(12) United States Patent
Huhmarkangas et al.

(10) Patent No.: US 7,496,440 B2
(45) Date of Patent: Feb. 24, 2009

(54) CHANGING THE DIMENSIONS OF THE LOAD SPACE OF A WORKING MACHINE

(75) Inventors: Arto Huhmarkangas, Tampere (FI); Henry Palonen, Tampere (FI); Matti Lamminen, Tampere (FI)

(73) Assignee: John Deere Forestry Oy, Tampere (FI)

( * ) Notice: Subject to any disclaimer, the term of this patent is extended or adjusted under 35 U.S.C. 154(b) by 697 days.

(21) Appl. No.: 10/471,968

(22) PCT Filed: Jan. 15, 2003

(86) PCT No.: PCT/FI03/00023

§ 371 (c)(1),
(2), (4) Date: Sep. 15, 2003

(87) PCT Pub. No.: WO03/059689

PCT Pub. Date: Jul. 24, 2003

(65) Prior Publication Data

US 2005/0066641 A1 Mar. 31, 2005

(30) Foreign Application Priority Data

Jan. 16, 2002 (FI) .................................. 20020079

(51) Int. Cl.
*A01D 85/00* (2006.01)
*A01D 51/00* (2006.01)
(52) U.S. Cl. .................. 701/50; 56/121.46; 56/221; 56/218
(58) Field of Classification Search .................. 701/50, 701/172, 36; 340/870.16, 440; 37/348, 314, 37/319, 417, 907; 144/343, 335, 117.4; 56/10.2 E, 56/344, 1, 228, 340.1, 121.46, 221, 218, 56/434, 466; 414/542, 555, 553; 180/418; 212/278; *A01D 51/00, 85/00*
See application file for complete search history.

(56) References Cited

U.S. PATENT DOCUMENTS 4,052,602 A * 10/1977 Horn et al. .................... 701/50

(Continued)

FOREIGN PATENT DOCUMENTS

DE 19756307 6/1999

(Continued)

*Primary Examiner*—Tuan C To
(74) *Attorney, Agent, or Firm*—Quarles & Brady

(57) ABSTRACT

Apparatus and method for changing one or several dimensions of a load space in a working machine, when the dimensions are width, height or length. In the method the weight of the load in the load space is determined or the weight of the load in a full load space is predicted on the basis of said determination and the current value of the dimension; a new value is calculated for the dimension by means of which it is possible to reach a set maximum quantity for the part of the weight of the load; and the dimension of the load space is adjusted either gradually or at once to a position according to the new value. In the method for changing the height of the load space the quantity of the load or a change in the quantity of the load in the load space is determined automatically; and the current height of the load space is adjusted to a new height or in accordance with a predetermined change of height that corresponds to the quantity of load according to a set dependency, wherein the height of the load space is at the same time kept as low as possible during the loading or unloading.

25 Claims, 1 Drawing Sheet

U.S. PATENT DOCUMENTS

| | | | | |
|---|---|---|---|---|
| 4,368,824 A * | 1/1983 | Thomasson | ............... | 212/278 |
| 4,574,854 A * | 3/1986 | Lindblom et al. | ........ | 144/24.13 |
| 4,639,186 A * | 1/1987 | Mellgren | ................ | 414/734 |
| 4,665,961 A * | 5/1987 | Forslund | ............... | 144/24.13 |
| 4,881,865 A * | 11/1989 | Herolf | ................ | 414/550 |
| 5,427,486 A * | 6/1995 | Green | ................ | 410/118 |
| 5,642,821 A * | 7/1997 | Hafliger | ................ | 212/177 |
| 5,645,181 A * | 7/1997 | Ichiba et al. | ............... | 212/281 |
| 5,711,440 A * | 1/1998 | Wada | ................ | 212/278 |
| 5,732,835 A * | 3/1998 | Morita et al. | ............... | 212/278 |
| 5,773,768 A * | 6/1998 | Nuyts | ................ | 177/136 |
| 5,824,965 A * | 10/1998 | Fujii et al. | ............... | 177/136 |
| 6,118,083 A * | 9/2000 | Boyovich et al. | ............ | 177/136 |
| 6,170,681 B1 * | 1/2001 | Yoshimatsu | ............... | 212/278 |
| 6,272,413 B1 * | 8/2001 | Takahashi et al. | ............. | 701/50 |
| 6,421,997 B1 * | 7/2002 | Mann | ............... | 56/384 |
| 2004/0025424 A1 * | 2/2004 | Arola et al. | ............... | 47/10 |

FOREIGN PATENT DOCUMENTS

| | | |
|---|---|---|
| EP | 1084941 | 3/2001 |
| FI | 76295 | 12/1985 |
| FI | 104318 | 2/1999 |
| SE | 420699 | 10/1981 |
| SE | 426677 | 2/1983 |
| WO | 91/14610 | 10/1991 |

* cited by examiner

CHANGING THE DIMENSIONS OF THE LOAD SPACE OF A WORKING MACHINE

CROSS REFERENCE TO RELATED APPLICATIONS

This application claims priority of International Patent Application PCT/FI03/00023, filed on Jan. 15, 2003, and FI Application 20020079, filed on Jan. 16, 2002.

BACKGROUND OF THE INVENTION

1. Field of the Invention

The invention relates to a method for changing one or several dimensions of a load space in a working machine. The invention also relates to a method for changing the height of a load space in a working machine. Furthermore, the invention relates to an apparatus for changing one or several dimensions of a load space in a working machine.

2. Description of the Related Art

For harvesting, working machines, such as harvesters are known which move on a terrain by means of wheels or tracks and in which a harvesting device, a so-called harvester head, is provided at the end of a boom assembly for cutting, felling, and delimbing a standing tree stem and sawing it to pieces of desired length. The sawn tree stems are collected with a forwarder equipped with a grapple, and transported in its load space. A known load-carrying vehicle, movable by means of wheels is disclosed in the application publication WO 91/14610, said working machine comprising two frame parts connected to each other by means of a joint. The rear frame is equipped with a load space in which the tree stems are collected. The front frame is equipped with a cabin and a power source for the working machine.

For changing the load space of a forwarder, there is a known apparatus according to the publication SE 420699, in which the stakes restricting the load space can be extended telescopically. Publication SE 426677A also discloses a telescopically operating apparatus, wherein the height of the stakes and their mutual distance can be adjusted. The systems are intended especially for compression of the load. There is a known solution according to the patent publication FI 76295 for changing the length of the load space.

It is necessary to change the surface area and height of the load space so that the entire capacity of the load-carrying vehicle could be utilized, especially in the case of wood material and/or tree stems that is/are lighter or shorter than usual. Thus, the maximum capacity and maximum loadbearing capacity are not utilized even if the load space is full, wherein it is possible to increase the quantity of timber from normal by expanding the load space. Some solutions of related art have the drawback that it is often impossible and even dangerous to open manual lockings, especially when the load space contains timber. Thus, the load space must be adjusted beforehand, but it is difficult to predict the quantity and weight of timber beforehand.

The size of the load space can also be changed by means of pressurized medium operated actuators, which is safe, because it is possible to control the actuators from the cabin of the working machine. The systems require for example a control circuit, pipes and cylinders that are installed and integrated in the stakes. Thus, it is easy to adjust the load space in its maximum and minimum position, but it is still difficult to estimate the weight and quantity.

There are known weighing devices for weighing a load to be lifted up by a grapple, such as single tree stem or a bundle of stems, said weighing devices being coupled between the end of the boom assembly and the grapple. The device collects information on the quantity loaded in the load space. There are also known weighing devices installed in the bunks of the load space, and on the basis of the loading of said weighing devices it is possible to measure the weight of the loaded timber. By means of the measurement it is now also possible to monitor that the maximum capacity of the forwarder is not exceeded. There are also other known weighing devices that can be based for example on the identification of the loading exerted on the wheels or affecting in the structures, on the basis of which the increased load can be determined.

The load spaces that identify only the maximum and minimum position and/or that are based solely on the act of monitoring whether the maximum capacity is exceeded during the loading, are inadequate. The width of the load space and the location of the centre of gravity have an effect especially thereon in which kind of terrain and in how narrow surroundings in a forest it is possible to move for example with a forwarder. This is not taken into account in present systems in any way, wherein optimization of the various relevant factors is not possible. A load space that is positioned in a stepwise or continuous manner makes it possible to conduct even small changes, but if the driver is inexperienced, unnecessary changes and interruptions may occur during the work. As a result, the user may be distracted from the actual loading work, and making decisions relating to the changes takes time and requires actions to be taken.

SUMMARY OF THE INVENTION

In the system according to the invention the volume and surface area of the load space are changed constantly or step by step, wherein adjustment possibilities are improved. The system also contains a weighing device, wherein the act of changing the load space is based for example on monitoring of weight. It is especially an aim of the invention to reduce the steps to be taken and the number of times when the load space is changed.

In the invention, the aim of the system is to automatically estimate the final quantity and weight of the load on the basis of the weight of the timber that has been already loaded, wherein at the same time the dimensions of the load space are taken into account at the moment of weighing. At the moment of estimation the load space is full loaded or it can also be half full, wherein the load space can be in its maximum or minimum dimensions. The system sets the load space into a size complying with the prediction, and at the same time it is possible to optimize other factors as well, for example retaining of maximum stability, maintaining of minimum width or minimizing of the lifting height of the boom assembly. By means of the system it is preferably possible to adjust both the width and the height, so that optimization would be as versatile as possible. By means of the invention for example only that part of the overall width and/or height is used that is necessary for attaining the maximum capacity or another set maximum loading. By means of the automatic system it is, first of all, possible to avoid manual calculation and decision-making.

In a preferred embodiment of the invention, the act of changing the height is also utilized during the loading and unloading processes, wherein the work stages become accelerated. During the operation the side supports of the load space are lifted up or lowered down, but only such an amount that is necessary for keeping the load in the load space. The side supports are thus constantly as low as possible, wherein the vertical lifting movements of the grapple become shorter, and it is not necessary for the grapple to rise over the high-situated side supports. Thus, the work is accelerated and enhanced especially when wood piles are handled. The lifting of the side supports can be synchronized with the development of the weight of the load, wherein the supports are automatically changed constantly, or by the order of the user at desired intervals. The change of the height can be combined with those actions that are intended for optimization of the volume of the load space, or it can be used on its own for optimization.

BRIEF DESCRIPTION OF THE DRAWINGS

In the following, the invention will be described in more detail by using as an example an advantageous embodiment of the invention with reference to the appended drawing, which.

DETAILED DESCRIPTION OF THE INVENTION

Figure 1:
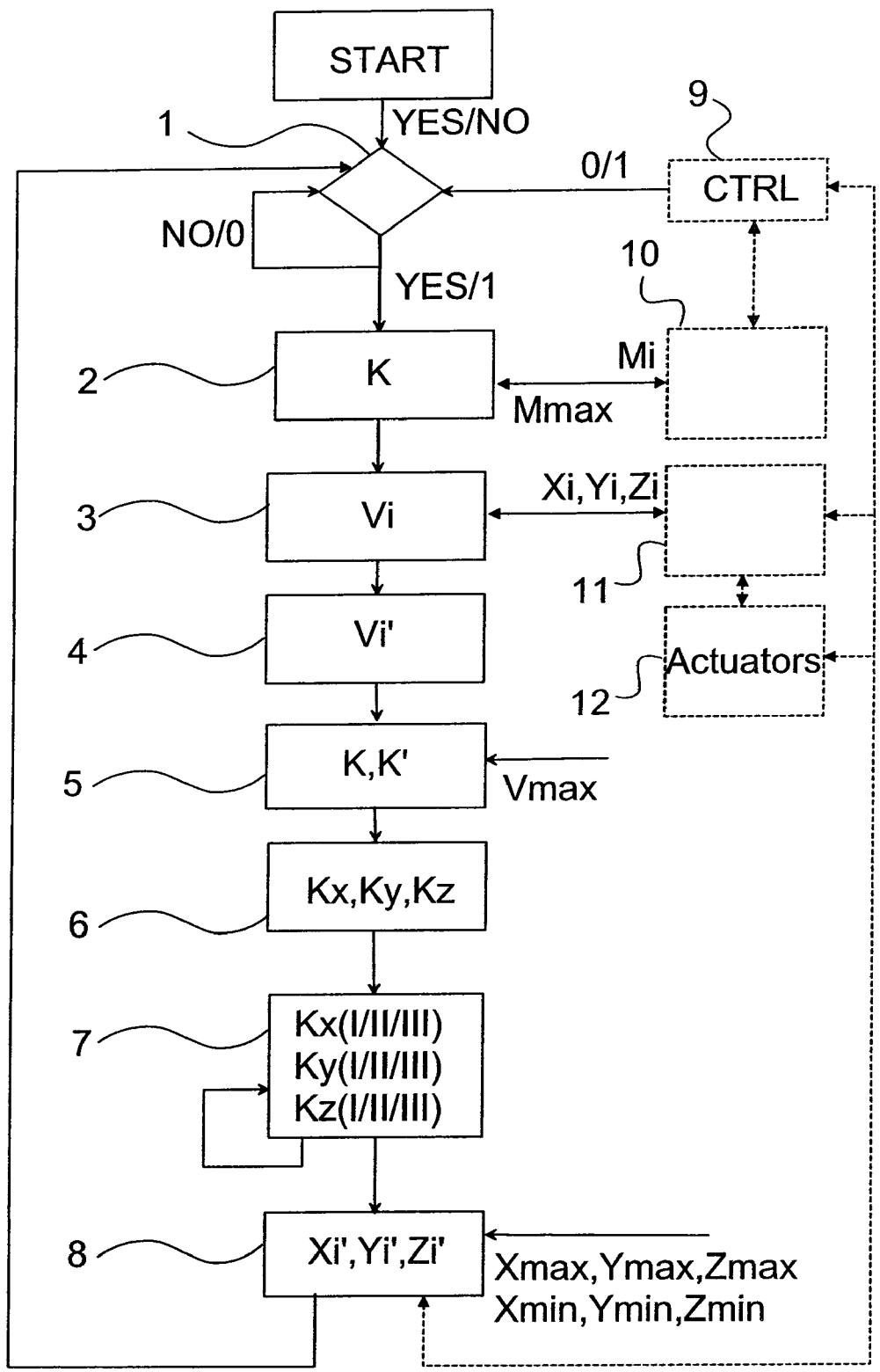
FIG. 1 shows an implementation according to a preferred embodiment of the invention in a flow chart.

The invention can be applied especially in forest machined whose load space can be at least widened and narrowed in the horizontal direction by means of actuators 12. The changing of the load space takes place especially by moving a stake functioning as a side support. The length of the stake and its upper edge or another point therein indicates for the user the level up to which it is possible to load tree stems, wherein the load space is preferably raised and lowered by adjusting the height of the stake. Its is also possible to apply the same principle for adjusting the length of the load space, although the load space of a forwarder does not normally contain a rear wall that would control the loading. Moreover, the length of the logs to be handled varies for example between 1 to 7 meters, wherein two or several logs of 1 to 3 meters in length can be placed in the space successively.

The load space typically comprises a front wall that operates as a log guard. When the log guard is transferred in the longitudinal direction of the working machine, it is at the same time possible to affect the location of the centre of gravity of the load. It is an advantageous aspect of the invention that the height and width of the log guard can also be adjusted, wherein they correspond to the dimensions of the changed load space, or the dimensioning corresponds to the maximum load space.

The arrangement according to the invention is also functional in other moving vehicles that comprise a load space for example for transport of timber, such vehicles being for example log trucks and their trailers, tractors and their trailers, and other various vehicles that move on a terrain and are used for transferring for example tree stems.

The stake functions as a side support, preventing the load from moving horizontally. The frame supporting the stake is often formed into a curved shape, or into a partly U-shaped so-called bunk. The stake can also be replaced with a wall or a corresponding side support that is suitable for the use. The stake is either stationary or removable, the mechanism transferring the stake is know as such and it can be implemented in a desired manner. Generally the implementation requires actuators 12 that function and are controlled by means of pressurized medium, said actuators 12 being controlled by the control system of the working machine itself for example by means of electric signals. Thus, it is possible to use especially hydraulic cylinders controlled by means of valves, the input of the control of said hydraulic cylinders being a voltage/current signal and the output the lengthened or shortened position of the cylinder.

The invention can be implemented under a separate control system that communicates with control system of the working machine for example via a data transmission bus. The user, in turn, control the function of the control system by giving necessary inputs for example in the form of parameter values, and orders the control system to perform the desired functions or to start the calculation and the control of the actuators 12 to change the load space. The system contains the necessary calculation and memory means by means of which the necessary calculation stages can be implemented, and the necessary Input/Output means for processing parameters. The control system utilizes the information obtained from the sensors, said information relating for example to the position of the stakes, and the working machine especially also comprises means by means of which the weight of the load and thus the quantity of the load can be determined at a given time. The value of the dimensions can be determined directly by means of sensors that are attached to the mechanism of the load space or indirectly by means of sensors attached to the actuators 12. The control of the actuators 12 also often makes it possible to determine the dimension indirectly with a sufficient precision, even if for example the position of the actuator 12 was not measured. Thud for example information on the number of control timed is utilized, if the actuator 12 functions in a stepwise manner. The transition can also be estimated sufficiently accurately on the basis of delays and the duration of the control signal or by means of limit switches. It is possible to apply various known systems for the measurement of weight, said systems determining the weight of the load by means of accumulation or single weighing. The selection, structure, components and more detailed implementation of the system are known as such by anyone skilled in the art, if the description hereinbelow is also utilized. The signal received from the weight measurement that describes the weight of the load is sufficient for optimizing the load space.

With reference to the drawing, the optimization is preferably started with a signal given by the user, which is attained by a command or another input given to the control system 9 of the working machine, for example by selecting a function from a menu at the desired moment. The system can also automatically monitor the weight of the load and instruct the user to start the optimization when a predetermined weight is attained. At said moment the load space is full loaded, which the user can observe for example visually. The control monitors (NO/0) whether a command (0/1; YES/NO) has been given (step 1) and takes action if optimization is desired (YES/1). The control obtains information Mi on the weight of the load from the weighing means 10, said information being shown for example in kilogrammes (kg). The control is aware of the maximum capacity Mmax used in the working machine and in the load space in kilogrammes or information thereon is input in the control (step 2). The unused capacity is obtained as a coefficient K (Mmax/Mi), wherein K is typically larger than FIG. 1. The value of K indicates how much the prevailing, current size of the load space can be increased before Mmax is attained. Thus, it is of course required that the density (weight/volume) of the material to be loaded corresponds to the average density of the already loaded material. In an overload situation K is smaller than FIG. 1. The current size of the load space, i.e. the volume Vi is attained in accordance with the width Xi, height Zi and length Yi, wherein the product of the same is calculated (step 3). In a forwarder the value Yi is typically constant, or it does not have to be taken into account.

Furthermore, it should be noted that an increase in the width Xi causes for example spreading of the logs, wherein the load becomes lower in height, but mere changing of the length Yi does not always affect the height of the load. The additional space attained by changing the length Yi can be utilized in its entirety only when the lengthening is so extensive that it is possible to load short logs or other kind of wood material in the additional space. The presented factors must be taken into account as corrections in the calculations, or only that additional space is taken into account that is located above the upper surface of the load. The actual situation can be determined on the basis of the measured weight. The reduction of length $Y_i$ especially for the part of logs is not possible, wherein the location and at the same time the length $Y_i$ of the front wall is set in a suitable location because of the wood species or for example centre of gravity already when the loading begins. The centre of gravity can be changed during the loading when the entire load space can be moved.

A dimension $X_i$, $Y_i$ or $Z_i$ of the forwarder that can never change, can be set into a constant value in the calculation. When necessary, the current value of the changing dimension can be attained from the control 9 or from sensors 11 connected to the control, or the value of the dimension can be determined in another manner. The control has information thereon whether one of the dimensions is a variable or a constant value. The change of the load space typically begins in a situation in which the load space in its smallest ($X_{min}$, $Y_{min}$, $Z_{min}$), because the widening of the load space is easier than for example forcing tree stems into a narrower space. As for the length $Y_i$ and the front wall, it is often necessary to begin in a situation where the load space is at its longest.

The new intended size $V_i'$ of the load space is attained by multiplying K and $V_i$ (step 4), wherein $V_i$ must not exceed the parameter value $V_{max}$ (step 5) that illustrates the maximum volume attained by means of the changes in dimensions. $V_{max}$ and $M_{max}$ do not always correspond to each other, if the density varies. $V_{max}$ is exceeded in the calculation, if the density of the material to be loaded is low. If the density of the material is high, $V_{max}$ can be exceeded even when the density is $V_i$, which must be monitored by means of the weighing system. If $V_{max}$ is exceeded as a result of the calculation, the intended volume is set into the value $V_{max}$, and the maximum value of K must be reduced correspondingly into the value K' that is attained when $V_{max}$ is divided with the value $V_i$. It is obvious that the value $V_{max}$ can also be another desired value, for example a desired quantity or batch that is to be loaded in the load space.

At the next stage it must be decided whether one or several dimensions are to be changed at once, and which dimension is changed first. The load space can be changed for example in such a manner that the entire width is first utilized, wherein only $X_i$ changes into the value $X_i'$ (or $X_{max}$) that corresponds to the product of the values K (or K') and $X_i$, wherein the other dimensions remain the same. The entire change K (or K') of the load space can be divided into dimension-specific conversion coefficients $K_x$, $K_y$ and $K_z$, whose product and combined effect must be K (step 6). These coefficients are some kind of weighting coefficients between dimensions $X_i$, $Y_i$, $Z_i$, wherein the value 1 indicates constancy and stability. Preferably different weighting coefficients have a larger value than 1, wherein the dimensions are always enlarged (step 8). The mere change in width ($X_i'$) is advantageous in that respect that the centre of gravity of the load remains as low as possible, wherein the working machine is capable of moving forward even in a difficult terrain. By changing only the height from the value $Z_i$ to the value $Z_i'$ (or $Z_{max}$), which is now the product of the values K (or $K_z$) and $Z_i$, it is possible to maintain the width of the working machine as small as possible, wherein especially in connection with thinning and in other situations as well, the route used by the working machine becomes narrow and the working machine fits into narrow gaps.

Different dimensions cannot change outside the maximum values ($X_{max}$, $Y_{max}$, $Z_{max}$) and the minimum values ($X_{max}$, $Y_{max}$, $Z_{max}$), because the possibilities to move the mechanism are limited. The control is aware of these values. If the entire width $X_{max}$ of the load space is in use and the maximum capacity $V_{max}$ has not been utilized yet, it is in the end possible to change the height $Z_i$ as well, or to change it more than was intended. The portion ($K_z$) of the height remaining after the change (when $K_y$ is constant) is attained by calculating the actual $K_x$, wherein $X_{max}$ (or another attained maximum dimension) is divided with the current value $X_i$ of the width, and the value K is divided with the result, wherein $K_z$ is attained as a result. Thereafter the height is changed into the value $Z_i'$ (or $Z_{max}$) (step 8) that is attained by multiplying $Z_i$ with $K_z$.

It is possible to determine a priorization for the changes for the control (in the order I, II or III), wherein one of the dimensions is changed first, and its entire variation margin is utilized first (step 7). The variations can also occur simultaneously, wherein the weighting coefficients ($K_x$, $K_y$, $K_z$) of the dimensions are equal or different from each other or their ratio is set into the desired value.

The simultaneity does not necessarily mean that dimensions change at the same time, but the changes occur before the user continues the loading of the load space. Preferably the control gives the user a sound signal or another signal, indicating the load space has been transferred in its final position. In addition, the control also provides the user with information for example thereon how large a portion (e.g. in percentages) of the maximum dimension has now been used, and whether the maximum capacity $M_{max}$ can be attained. In the end of the loading it is also possible to check the actual situation in such a manner that the user checks the weight of the load. In the end of the loading, an order can be given to perform the above-identified steps but without allowing the changes in the dimensions, wherein the control indicates whether $M_{max}$ is attained with the present dimensions, or whether a value that is higher or lower than $M_{max}$ is attained.

The output attained from the control contains for example in signal information on the intended dimensions ($X_i'$, $Y_i'$, $Z_i'$). The information may also indicate the coefficients $K_x$, $K_y$ and $K_z$ or another coefficient or information on the basis of which the control changes the dimensions. The control system 9 of the working machine, in turn, guides the actuators 12 into such a position that corresponds to the desired volume of the load space at a given time. The changes in the dimensions of the log guard are also based on the same signals or parameter values.

The above-described calculation only relates to the main principles and additional decision-making processes may also be related thereto. The necessary calculation algorithms are implemented in the calculation means of the control preferably by means of software, wherein the inputs are parameters and their values received from the sensors and elsewhere from the control, especially from its memory means. It is also possible to utilize empirical parameters and weighting coefficients, by means of which it is possible to correct the calculation if the density of the material to be loaded changes significantly. The dimensions of the load space can be changed preferably in a stepless manner. If the dimensions $X_i'$, $Y_i'$, $Z_i'$ can only be set step by step, the control selects the most suitable step and corrects the values of the coefficients $K_x$, $K_y$, $K_z$ in a corresponding manner.

The changing of the dimensions of the load space can also be ordered in a situation where the load space is approximately half full. Thus, the measured weight must be multiplied with two to attain the actual $M_i$, which is, of course, only a prediction. The control must somehow be informed how full the load space is (for example in percentages), so that it would be possible to estimate the $M_i$ that can be attained with present dimensions. The term full load space refers for example to such a situation where the entire volume is in use, or a predetermined portion of the volume is in use. To be on the safe side, especially the stakes may be higher than the full load space and thus the load. The height of the full load space may be marked in the load space or stakes.

When the different sides of the load space can be changed by means of different actuators 12, the centre of gravity of the load and its centering can also be controlled in such a manner that the load space is widened more towards the one side than to the opposite side(asymmetrical situation) Information on the unbalance or division of the load on different sides of the working machine is attained from the weighing device, and the system makes the decisions on the primary widening direction. The positioning of the load and the centre of gravity symmetrically or asymmetrically can thus be include as one factor in the optimization. When the balance has been found it is possible to increase the width equally in both directions, until the margin of adjustment of the other dimension is utilized, whereafter it is possible to increase the height. The balance can also be controlled with stakes of different heights, wherein a greater load is loaded on the other side of the load space. In the first instance use is made of the width direction, because otherwise the height is increased too much, and the centre of gravity moves higher.

In a second embodiment of the invention the control monitors the weight of the load and changes the current load $Z_i$ always to a new height $Z_i'$, when necessary. The change is preferably timed to the moment when the loading apparatus that typically comprises a grapple and a boom assembly, has had time to exit the load space. The timing can be determined on the basis of the work stages or position of the grapple, or on the basis of a delay. The automatic change can also be initiated when allowed by the user of the working machine, and at a desired moment. When the height is changed, it is all the time possible to utilize calculation and function relating to the parameters $V_{max}$, $M_{max}$ that have been described above. Thus, the change of the height $Z_i$ is not implemented at once, but transition to the new height $Z_i'$ takes place gradually when the load space becomes full and when the weight $M_i$ or mere change of the weight is monitored. The transition takes place in situable steps, depending on the actuators 12 in use.

Instead of the total weight $M_i$ it is also possible to monitor only that quantity and weight of timber that is loaded at once to the load space with the grapple. When the accumulated weight exceeds a predetermined limit, the height is changed and the accumulation starts again for example from the beginning. The set limits correspond to a given change in the height $Z_i$ according to a predetermined dependency, wherein it is not necessary to monitor the dimensions by means of sensors. Thus, it is sufficient that the dimensions are arranged into a reference position ($V_{max}$, $V_{min}$) and the dimensions are changed step by step, which also applies in the above-described optimization of the volume ($X_i$, $Y_i$, $Z_i$).

The variation in the quantity of load can also be estimated by means of the recurring movements of the boom assembly (loading and unloading), as long as the control is also provided with information on the wood species, on the basis of which it is possible to predict the density, the average weight to be handled by the grapple or the volume occupied by the timber, which can be determined even on the basis of the position of the grapple. The determination of quantity can be based purely on estimation. When logs are handled, it is possible to determine the transition to take place when a certain quantity of logs have been removed or added. The method for determining the quantity of load can be inaccurate, but it can be applied in working machines that do not comprise a weighing apparatus, and the user can manually adjust the side supports at the correct height. Inaccuracies occur especially when the monitoring is based on the calculation of the number of logs, and several short logs are placed successively. Thus, the height of the load is not increased at all, wherein monitoring of weight is more accurate in this case.

A single change step of a dimension can be selected for example on the basis of one or several quantities of timber that are positioned in the grapple, wherein suitable dependency is utilized. In the handling of logs the change is preferably in the order of the diameter of the log, and when timber of smaller size is used, the lifting need is smaller. The system is also used when emptying the load space, wherein the change step is negative, and finally the height attains the minimum value $Z_{min}$. As a result of the change the side supports are not, however, allowed to move lower than the top plane of the wood material, and preferably they are always somewhat higher than the top plane of the wood material. The control is preferably constructed in such a manner that the user can bypass the automatic function, if necessary, and lift (or lower) the side supports, whereafter the changes continue automatically as before and in the earlier magnitude. When the height has a certain safety margin, it is possible to first load the timber, and the change takes place only after the adding and not for example when timber is about to be transferred to the load space.

The invention is not limited solely to the above-presented embodiment, but it can be modified within the scope of the appended claims.

The invention claimed is:

1. A method for changing at least one dimension of a load space in a working machine, the dimensions defining the volume of the load space and including a width dimension, a height dimension and a length dimension, wherein the method comprises the steps of:
   determining the weight of the load in the load space,
   using a control and calculation system to calculate a new value for the at least one dimension, by means of which it is possible to attain a set maximum quantity for the weight of the load, and
   adjusting an actuator to adjust the at least one dimension of the load space either gradually or at once to a position corresponding to the new value, the adjustment of the at least one dimension of the load space changing the volume of the load space.

2. The method according to claim 1, wherein the step of adjusting the at least one dimension comprises adjusting a predetermined first dimension, and, if the set maximum quantity is not attained by the change of the predetermined first dimension, adjusting another dimension.

3. The method according to claim 1, further comprising the step of selecting a weighting coefficient for each new value, the weighting coefficient determining a proportion of the change in the size of the load space when at least two dimensions are changed.

4. The method according to claim 1, further comprising the step of using the recommended maximum capacity of the weight of the load of the working machine that can be transported by the working machine as said set maximum quantity.

5. The method according to claim 1, wherein the load space comprises a plurality of side supports, and the method further comprises the steps of:
   determining the width dimension of the load space on the basis of the distance between a first and a second of the plurality of side supports of the load space, and
   determining the height dimension of the load space on the basis of the height of any of the plurality of side supports.

6. The method according to claim 1 wherein the step of adjusting the at least one dimension of the load space comprises initially adjusting the width dimension.

7. The method according to claim 1 wherein the step of adjusting the at least one dimension of the load space comprises initially adjusting the height dimension.

8. The method according to claim 1 further comprising the steps of: determining the location of the centre of gravity of the load in relation to the working machine by means of measurements and calculations, and
   changing the at least one dimension in such a manner that the centre of gravity moves to the desired location in relation to the working machine or the centre of gravity remains at the desired location in relation to the working machine.

9. The method according to claim 1 further comprising the step of changing the at least one dimension a substantially equal magnitude on different sides of the working machine, wherein the location of the centre of gravity of the load in relation to the working machine remains unchanged.

10. The method according to claim 1 wherein the step of adjusting the at least one dimension comprises the step of gradually adjusting the height of the load space to a position complying with the new value and, in accordance with a set dependency, with the weight of the load located in the load space during the loading of the load space.

11. The method according to claim 1, further comprising the step of changing the at least one dimension to a different magnitude on different sides of the working machine, wherein the location of the center of gravity of the load changes in relation to the working machine.

12. The method according to claim 1, wherein the load space is full when determining the weight of the load in the load space.

13. The method according to claim 1,
wherein the load space is not full when determining the weight of the load in the load space, and
wherein the method further comprises the step of predicting the weight of the load in the full load space on the basis of said determination and the current value of said at least one dimension.

14. The method according to claim 1, wherein the new value for said at least one dimension depends of the limits said at least one dimension is allowed to change.

15. The method according to claim 1, wherein the actuators are controlled by the control and calculation system, and wherein the control and calculation system is configured to calculate the new value based on the determined weight of the load.

16. An apparatus for changing at least one dimension of a load space in a working machine, the dimensions defining the volume of the load space and including a width dimension, a height dimension and a length dimension, said apparatus comprising:
a weighing device configured to measure or determine the weight of the load in the load space,
a control and calculation system configured to calculate a new value for the at least one dimension to attain a set maximum quantity for the weight of the load, and
actuators configured to adjust the at least one dimension of the load space to a position corresponding to the new value,
wherein the adjustment of the at least one dimension of the load space changes the volume of the load space.

17. The apparatus according to claim 16, wherein the control and calculation system is further configured to estimate the weight of the load space when full based on the current weight of the load and the current value of the at least one dimension, when the load space is not full at the moment of the measurement.

18. The apparatus according to claim 16 wherein the actuators are configured to enable a change of substantially equal magnitude in the at least one dimension on different sides of the working machine under the control of the control and a calculation system, wherein the location of the centre of gravity of the load in relation to the working machine remains unchanged.

19. The apparatus according to claim 16 wherein the control and calculation system is further configured to adjust the height dimension of the load space gradually to a position complying with the new value, and in accordance with a set dependency, with the weight of the load located in the load space during the loading of the load space.

20. The apparatus according to claim 17, wherein the actuators are configured to enable a change of substantially equal magnitude in the at least one dimension on different sides of the working machine under the control of the control and calculation system, wherein the location of the centre of gravity of the load in relation to the working machine remains unchanged.

21. The apparatus according to claim 17, wherein the control and calculation system is further configured to adjust the height dimension of the load space gradually to a position complying with the new value, and in accordance with a set dependency, with the weight of the load located in the load space during the loading of the load space.

22. The apparatus according to claim 16, wherein the actuators are configured to enable a change of different magnitude in said at least one dimension on different sides of the working machine under the control of the control and calculation system, wherein the location of the center of gravity of the load changes in relation to the working machine.

23. The apparatus according to claim 17, wherein the actuators are configured to enable a change of different magnitude in said at least one dimension on different sides of the working machine under the control of the control and calculation system, wherein the location of the center of gravity of the load changes in relation to the working machine.

24. The apparatus according to claim 16, wherein the actuators are controlled by the control and calculation system, and wherein the control and calculation system is configured to calculate the new value based on the measured or determined weight of the load.

25. An apparatus for changing at least one dimension of a load space in a working machine, the dimensions defining the volume of the load space and including a width dimension, a height dimension and a length dimension, said apparatus comprising:
a weighing device configured to measure or determine the weight of the load in the load space,
a control and calculation system configured to calculate a new value for the height dimension to attain a set maximum quantity for the weight of the load, wherein the control and calculation system is further configured to adjust the height dimension of the load space gradually to a position complying with the new value, and in accordance with a set dependency, with the weight of the load located in the load space during the loading of the load space, and
actuators to adjust the height dimension of the load space gradually to a position corresponding to the new value,
wherein the adjustment of the height dimension of the load space changes the volume of the load space.

* * * * *

UNITED STATES PATENT AND TRADEMARK OFFICE
CERTIFICATE OF CORRECTION

| | | |
|---|---|---|
| PATENT NO. | : 7,496,440 B2 | Page 1 of 1 |
| APPLICATION NO. | : 10/471968 | |
| DATED | : February 24, 2009 | |
| INVENTOR(S) | : Arto Huhmarkangas et al. | |

It is certified that error appears in the above-identified patent and that said Letters Patent is hereby corrected as shown below:

Abstract: Delete: "In the method ... loading or unloading."

Column 3, Line 17: "machined" should be --machines--

Column 3, Line 25: "Its" should be --It--

Column 3, Line 31: "the space" should be --the load space--

Column 3, Line 53: "know" should be --known--

Column 3, Line 62: "with control" should be --with a control--

Column 3, Line 64: "control" should be --controls--

Column 4, Line 11: "mechanism" should be --mechanisms--

Column 4, Line 16: "Thud" should be --Thus--

Column 4, Line 17: "timed" should be --times--

Column 4, Line 24: "and more" should be --and a more--

Column 7, Line 6: "include" should be --includes--

Column 7, Line 30: "situable" should be --suitable--

Signed and Sealed this

Twenty-first Day of April, 2009

JOHN DOLL
*Acting Director of the United States Patent and Trademark Office*